MAGNETIC CORE BINARY COUNTERS

Filed April 30, 1958

Inventor
Jean Auricoste
By Ralph B. Stewart
attorney

United States Patent Office 3,072,891
Patented Jan. 8, 1963

3,072,891
MAGNETIC CORE BINARY COUNTERS

Jean Auricoste, Paris, France, assignor to Societe d'Electronique et d'Automatisme, Courbevoie, Seine, France
Filed Apr. 30, 1958, Ser. No. 732,009
Claims priority, application France May 2, 1957
6 Claims. (Cl. 340—174)

The present invention relates to binary counters using saturable magnetic cores of a material having a substantially rectangular hysteresis loop and therefore having two stable magnetic conditions, a positive or P remanent induction condition and a negative or N induction condition.

Systems for handling binary coded information with recourse to such magnetic cores are presently known, not only for ensuring the progression of binary coded "words" along a cascade arrangement of such cores, but also for effecting elementary logical operations such as union, intersection, or the like between information bits.

According to the invention, a magnetic core binary counter is provided in which each binary stage thereof comprises the combination of a one-digit store and one intersection circuit (and circuit), these members having a common input for the digital signals of value 1 from a preceding stage, one output of the and-gate being connected to an inhibiting input of the one-digit store, one output of the one-digit store being connected to an activation input of the and-gate, and one output of the said and-gate being derived for the activation of the two similar members of the next following binary stage of the counter.

The invention will be described with reference to a particular two-core per bit system of handling binary coded information though it is by no means restricted to such a system.

Figure 1:
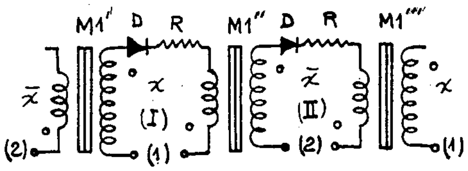
Figure 3:
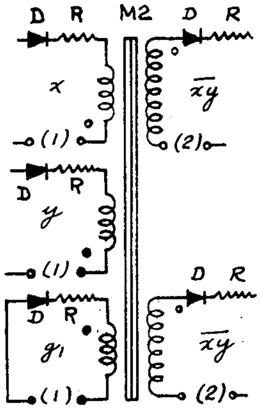
Figure 2:
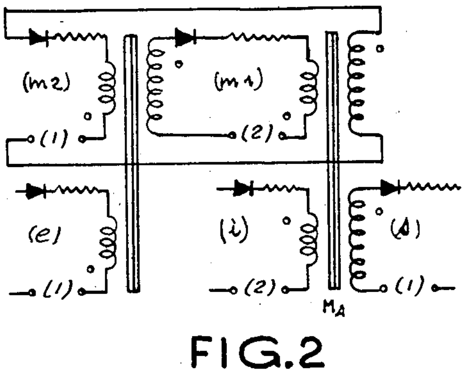
Figure 4:
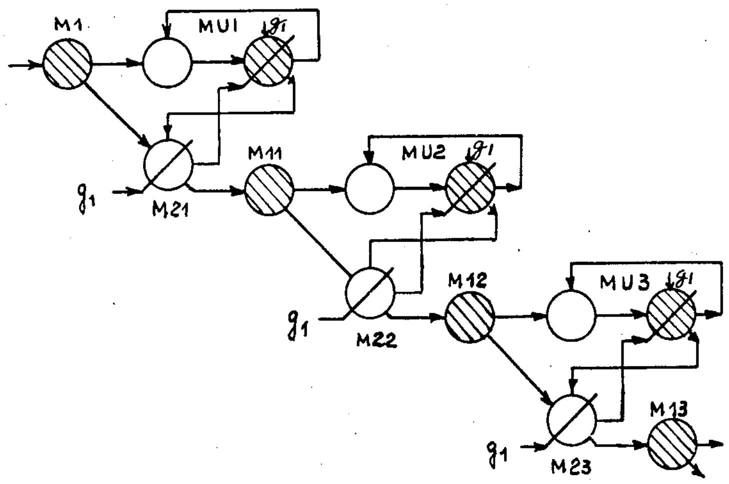

In the accompanying drawings, FIG. 1 shows part of a cascade arrangement of magnetic cores employed in my system, FIG. 2 shows a one-digit store also employed in my invention and FIG. 3 shows a magnetic core stage acting as an and-gate in the system of my invention; and FIG. 4 shows part of a binary counter system according to the invention and embodying the elementary circuits of the preceding FIGS. 1 to 3.

This particular system has been chosen to illustrate the invention since it involves quite simple circuitry and control. As will clearly appear from the following description, this simplicity is mainly due to the fact that the control is made by a two-phase alternating voltage (which may be of a sine waveform but a rectangular, saw-toothed or trapezoidal waveform may be used) directly acting on the networks which interconnect the magnetic cores so that no need exists for special and distinct control windings on the cores, as commonly used in known systems which use control currents applied to such separate windings.

In FIG. 1 three magnetic cores M1′, M1″ and M1‴ are shown each provided with an input winding and an output winding which preferably is of a higher number of turns than the input winding. Each interconnecting network such as (I) or (II) comprises at least an output winding of a core, which core then will act as an "emitter" in this network, and at least an input winding of a further core (which core will then act as a "receiver" core in the network). These windings are serially connected with a unidirectionally conducting element such as a diode D and, preferably though not necessarily, a damping resistor R is included in the circuit. Each network receives a voltage supply of alternating character and alternate networks in the cascade receive this supply voltage in alternate phases (1) and (2). That is, the even numbered networks are energized by the positive alternation of the alternating supply at the same time that the odd numbered networks are energized by the negative alternation, and vice versa. The "useful" alternation for each network in the said supply is the alternation which supplies current to the network and is determined by the direction of connection of the diodes D. Thus, the useful alternation of the supply voltage in a network is that which produces current in the network, the current flowing through the core output winding included in the network and tending to change the core of this winding from the P to the N condition, and acts upon the core input winding included in the said network and tends to bring the magnetic core thereof from N to P, if the current value is sufficiently high.

In such systems as the one of FIGS. 1 to 3, the transmission of a digit 1 from one stage to a further one is effected with a reversal of representation of the said digital value 1 from stage to stage. This is of course equally true for the digital value 0. It may be stated that a binary bit $x$ will appear, during the transmission thereof throughout a cascade of cores interconnected with such networks, alternately in the true representation, $x$, thereof, and in the complementary representation, $\overline{x}$, thereof. When, for instance and according to one possible convention, a magnetic core which is read-in in phase (2) presents the P magnetic condition at the end of this read-in alternation (or period of time), it bears the digital value 0 whereas, when it presents the N magnetic condition, it carries the digital value 1; conversely, a magnetic core which is read-in in phase (1) and presents the N magnetic condition at the end of this period carries the digital value 0 and, when it presents the P magnetic condition, it carries the digital value 1. This will be the hypothesis made for the following description.

The operation of FIG. 1 may be explained as follows: when $\overline{x}$ as applied to the first core M1′ (on the left-hand side) consists of a lower value current, this core remains in the N magnetic condition, digital value 1; then at the next useful alternation of phase (1) the current flowing through the network (I) will be at a higher value since it is not limited per se and this current changes the second core M1″ from the N to the P condition, which is digital value 1 for this core. The next following useful alternation of phase (2) will read-out this second core and bring it back to N, the current through the network (II) being limited to the coercive value as determined by the core M1″, and this lower value of current will not change the third core M1‴ which is at the N magnetic condition. When, on the other hand, the signal $\overline{x}$ is a higher value current supplied to the first core M1′, this core is brought to the P magnetic condition, and digital value 0 is stored; the read-out of this core will leave the second core M1″ at the N magnetic condition (also digital value 0), which will in turn enable a higher value current to flow through the network (II) and bring the third core M1‴ to the P magnetic condition; and so forth.

An intersection or and-gate using magnetic cores with control networks according to FIG. 1 is shown in FIG. 3. This circuit comprises a magnetic core M2 provided with three input windings respectively supplied with information signals $x$, $y$ and a signal $g_1$ which is a recurrent and uninterrupted series of signal pulses of digital value 1. The winding to which this signal $g_1$ is applied acts as an inhibiting or blocking winding which, if no sufficient action opposed thereto is applied to the core M2, maintains the core in the N magnetic condition. This inhibition effect can only be overcome when both the current values of $x$ and $y$ are high, but if only one of these signals is high, the core remains in the N condition. The stage acts as an and-gate delivering the output signal $\overline{x.y}$, since the result of intersection appears in the complementary form at the output winding of such a stage. It will suffice that this complementary signal is applied to a "normal" magnetic core stage to obtain a signal representing the intersection result in its true form at the output of this following stage. As shown, the circuits of the three input windings on core M2 are all controlled by phase (1) while the circuits of the output windings are controlled by phase (2) of the alternating supply.

FIG. 2 shows a one-digit store which comprises two magnetic cores M3 and M4 interconnected by a first network *m*1 and back-coupled by a second network *m*2. An activating or input network is shown at (*e*) for acting on the first core M3 of this store for the read-in thereof. An inhibiting circuit, applied for instance to a winding on the second core M4 of the store, as shown at (*i*), operates when activated to clear the store. An output may be provided from this store, for instance by a network (*s*) connected to a winding on the core M4. Circuits (*e*), *m*2 and *s* are controlled by phase (1) while circuits *m*1 and (*i*) are controlled by phase (2).

The operation of the one-digit store of FIG. 2 may be explained as follows:

When the store is cleared, the core M3 is normally at the N magnetic condition. In each useful alternation of phase (2), the read-out signal from M3 through circuit *m*1 brings the core M4 to the magnetic condition P. This core M4 is reset to the N condition at each useful alternation of phase (1).

If during a useful alternation of phase (1), a signal of digital value 1 is introduced in the store by an incoming high current through circuit (*e*), the core M3 is brought to the P condition and subsequently is reset to N at the following useful alternation of phase (2), the core M4 being left in the N condition. Upon read-out of M4 by phase (1) core M3 will be set to the P condition by circuit *m*2. When an inhibition signal is applied from the network (*i*) to the core M4, during a useful alternation of phase (2), the core M4 is brought to the P condition and consequently clearing the store since the core M3 is brought back to the N condition thereafter.

The arrangement shown in FIGURE 1 is prior art, background art, with respect to the present invention as represented in FIGURES 2 to 4. FIGURE 1 is disclosed and claimed in co-pending application of Raymond et al. Ser. No. 671,854, filed July 15, 1957.

FIG. 4 shows a three stage binary counter according to the invention in a diagram wherein each magnetic core stage is represented by a circle, the cross-hatched circles being stages which are read-in in phase (2) and read-out in phase (1) of the supply, and the clear circles representing the stages which are read-in in phase (1) and read-out in phase (2). An inhibition input is marked by a diagonal line across the circle.

M1 is an input stage for the actuation of the counter and the output of this stage is connected to both the input of a one-digit store MU1 and to an and-gate stage M21. The output of the said and-gate stage is applied as an inhibition input to the second core stage of MU1, which, in addition to the normal input from the first core stage receives continuous signals of value 1 from source $g_1$. An output of the said second core of the store MU1 is applied to an input of the intersection stage M21 which also receives an uninterrupted series of value 1 signals from source $g_1$ as an inhibiting signal. The output of M21 is further applied to an intermediate stage M11 which drives the second binary stage of the counter which comprises a one-digit store MU2 and an and-gate M22 with the same relations and controls as the combination of corresponding elements in the first stage. Through a further intermediate stage M12, the output of this second binary stage of counter drives a third binary stage similarly including a one-digit store MU3 and an and-gate MU23 of identical interrelations and controls as the two preceding ones, and drives a third intermediate stage M13 for the control of the fourth binary stage of the counter, not shown.

The operation of a binary counter of FIG. 4 may be explained as follows: When the counter is reset, all the one-digit stores thereof are cleared so that the first magnetic core of each one-digit store remains at the N condition whereas the second magnetic core passes through the hysteresis cycle from N to P and back from P to N, see FIG. 2 in this respect. Since, however, the output from the associated and-gate would inhibit or prevent this normal zero operation, an uninterrupted source of signals of value 1 is supplied at $g_1$ for balancing out this stray inhibiting effect. In the rest condition, each and-gate M21, M22, M23, etc. has the magnetic core thereof maintained at the N condition by the inhibiting source $g_1$ associated therewith and consequently delivers a higher value current at the output thereof. This output controls the intermediate stage core so that this core automatically passes through the hysteresis cycle from N to P and back from P to N, as is obvious, and the output signal from any intermediate core stage then represents a digital value 0.

When a first 1-value signal arrives at the input of the core M1, this core remains at the N condition and consequently delivers a higher current to both inputs of MU1 and M21. The one-digit store MU1 is activated but the and-gate M2 does not have its condition modified as the signal from M1 is still inhibited by the signal from $g_1$, the second core of MU1 continuing to deliver a lower value current signal. The input signal is not transmitted through M21.

With the one-digit store MU1 activated, the second core thereof remains in the N condition. Consequently, a 1-value signal is applied to the and-gate M21 from this core but the action thereof is inhibited by the 1-value signal from $g_1$ applied to M21, the output of M1 being at the lower value of current after this first 1-value input.

When a second 1-value signal is applied to M1, this signal suppresses the inhibition on the and-gate M21 and the core of M21 is brought to the P condition. It will subsequently deliver a lower value current to M11 which will then remain at the N condition and deliver in turn a higher current value to the inputs of the second binary stage of the counter. In this second binary stage, the actions will then be as described for the first binary stage, the one-digit store MU2 will be activated but the and-gate M22 will not transmit the signal to the third stage of the counter.

The second 1-value signal has no action on the condition of the one-digit store MU1. However, when the and-gate M21 is read-out, the output thereof will suppress the inhibition on the second core of the store so that the 1-value signal from $g_1$ to this second core will bring it to the P condition. This actually clears or "erases" the store MU1 which returns to the zero condition.

When a third input 1-value signal is applied to M1, the first stage of the binary counter is restored to the activated condition thereof as previously explained for the first input signal. However, the condition of the second stage of the binary counter is not disturbed as is obvious.

When a fourth input signal is applied to M1, the first stage of the binary counter is cleared in the same manner as for the second input signal and delivers to the second binary stage a 1-value signal which acts on this second binary stage in the same manner as the second input signal acted on the first binary stage, viz. it clears this second binary stage, with transmission of an activating signal to the third binary stage, which is set to a 1-value marking condition as explained for the first binary stage at the first input signal thereof; and so forth. The control of the counter is obviously effected according to the binary system of numeration, as required.

As previously stated, the features of such a counter would remain unchanged when a system of control currents on separate windings is used instead of the system of control voltages as herein-before considered for illustrative purposes.

I claim:

1. A magnetic-core binary counter stage comprising the combination of a one-digit store having a signal input circuit means and an inhibiting circuit means, an and-gate having one input connected to the output of the said store and a second input for incoming signals, a connection from an output of the said and-gate to the inhibiting circuit of said store, a common signal supply circuit means connected to the signal input of said store and to the second input of said and-gate, and an output from the said and-gate to the next binary stage of the counter.

2. A magnetic-core binary counter stage according to claim 1 wherein said one-digit store comprises two cores connected in cascade by a coupling circuit means, the said inhibiting connection from the said and-gate being applied to the second core of the one-digit store, and the connection from the output of said store to the said and-gate being derived from the said second core, and said and-gate comprising a single magnetic-core stage with means for applying thereto an uninterrupted series of 1-value pulses as an inhibiting signal.

3. A magnetic core binary counter stage according to claim 2 and including means for applying to the second core of the said store an uninterrupted series of 1-value pulses as an inhibition balancing input in the cleared condition of the store.

4. A magnetic core binary counter comprising a cascade of stages according to claim 2, and an intermediate magnetic-core stage inserted between each two successive binary stages of the counter as a complementing and-gate stage.

5. A bistable magnetic-core flip-flop arrangement comprising the combination of a one-digit two-core store and a one-core and-gate stage, common input signal means controlling both these members, means connecting an output of the second core of the store to an input of the and-gate stage, means connecting an output of the and-gate stage to an inhibiting circuit means of the said second core, a supply of 1-value signal connected to an input winding of said second core, and an output of the said and-gate stage comprising the output of the said arrangement.

6. A bistable magnetic-core flip-flop arrangement according to claim 5 wherein the said and-gate stage comprises an inhibiting circuit means energized by an uninterrupted series of 1-value signals, and including a complementing stage driven from the output of the said and-gate stage.

References Cited in the file of this patent

UNITED STATES PATENTS

| | | |
|---|---|---|
| 2,710,952 | Steagall | June 14, 1955 |
| 2,731,203 | Miles | Jan. 17, 1956 |
| 2,770,737 | Ramey | Nov. 13, 1956 |
| 2,816,278 | Whitely | Dec. 10, 1957 |
| 2,852,699 | Ruhman | Sept. 16, 1958 |